US010275790B1

(12) United States Patent
Krishnamoorthy et al.

(10) Patent No.: US 10,275,790 B1
(45) Date of Patent: *Apr. 30, 2019

(54) CONTENT TAGGING

(71) Applicant: A9.com, Inc., Palo Alto, CA (US)

(72) Inventors: Prasanna Krishnamoorthy, Karnataka (IN); Matthew Hamilton Battles, Palo Alto, CA (US)

(73) Assignee: A9.com, Inc., Palo Alto, CA (US)

(*) Notice: Subject to any disclaimer, the term of this patent is extended or adjusted under 35 U.S.C. 154(b) by 943 days.

This patent is subject to a terminal disclaimer.

(21) Appl. No.: 14/065,231

(22) Filed: Oct. 28, 2013

(51) Int. Cl.
*G06Q 30/00* (2012.01)
*G06Q 30/02* (2012.01)

(52) U.S. Cl.
CPC .............................. *G06Q 30/0251* (2013.01)

(58) Field of Classification Search
CPC ................................................. G06Q 30/0277
See application file for complete search history.

(56) References Cited

U.S. PATENT DOCUMENTS

| 6,804,659 B1* | 10/2004 | Graham | G06Q 30/02 |
| | | | 705/14.49 |
| 2008/0082904 A1* | 4/2008 | Martinez | G06F 17/3089 |
| | | | 715/205 |
| 2008/0201222 A1* | 8/2008 | Lahaix | G06Q 30/02 |
| | | | 705/14.44 |
| 2008/0288341 A1* | 11/2008 | Garbe | G06Q 30/02 |
| | | | 705/14.64 |
| 2009/0248524 A1* | 10/2009 | Defoy | G06F 17/30893 |
| | | | 705/14.1 |
| 2009/0254540 A1* | 10/2009 | Musgrove | G06F 17/30613 |
| 2010/0293063 A1* | 11/2010 | Atherton | G06Q 30/0277 |
| | | | 705/14.73 |
| 2012/0011001 A1* | 1/2012 | Gross | G06F 17/243 |
| | | | 705/14.66 |
| 2012/0054209 A1* | 3/2012 | Priyadarshan | G06F 17/30221 |
| | | | 707/753 |
| 2012/0084150 A1* | 4/2012 | Nussel | G06Q 30/0257 |
| | | | 705/14.55 |
| 2012/0204086 A1* | 8/2012 | Stoner | G06F 17/214 |
| | | | 715/201 |

(Continued)

OTHER PUBLICATIONS

Wikipedia, A9.com.*

(Continued)

*Primary Examiner* — Alvin L Brown
(74) *Attorney, Agent, or Firm* — Hogan Lovells US, LLP

(57) ABSTRACT

Various embodiments enable a user editing a document to tag product references in the document. These product references can then be recognizable when the document is published online, thereby enabling ad units (or other personalized units associated with the content) to be inserted either at a location associated with a particular product reference or within the document in a designated location. For example, when editing or drafting a document, a client-side tool could enable a user to tag particular words within the text to create a hyperlink to product pages of an electronic marketplace. In another example, a client-side tool could auto-insert a list of words associated with subject matter of the same. Accordingly, mentions of these words in content could be auto-converted into text-links or hyperlinks to a respective items page of the electronic marketplace.

18 Claims, 12 Drawing Sheets

(56) References Cited

U.S. PATENT DOCUMENTS

2015/0212992 A1\* 7/2015 Anderson .......... G06F 17/3089
715/234

OTHER PUBLICATIONS

Joe Wikert, Why Advertising Could Become Amazon's Knockout Punch.\*
Use Amazon's Search Inside the Book Feature to Sell More Books.\*
Wei Wu, Bin Zhang & Mari Ostendorf, Automatic Generation of Personalized Annotation Tags for Twitter Users.\*

\* cited by examiner

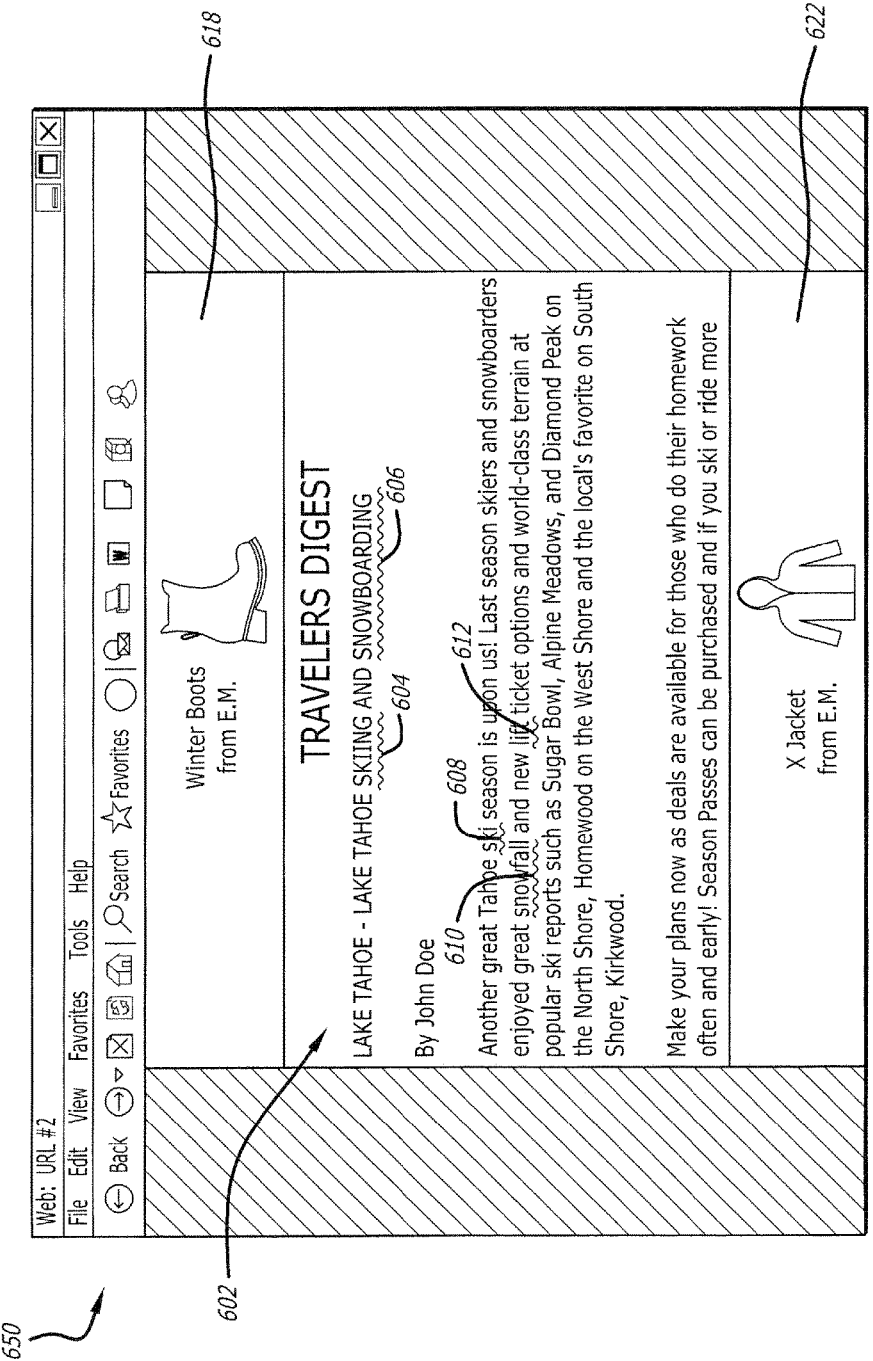

CONTENT TAGGING

BACKGROUND

The ability to identify product references is important for linking content making the product reference with a link to purchase or learn more about the product being referenced. Creating a link between a product reference and a webpage from an electronic marketplace to purchase the product, for example, can make such transactions more convenient for users, and enable content publishers to monetize their content by receiving a portion of the sale of the product, while also enabling the electronic marketplace to sell more products. Accordingly, there is a need to more adequately identify product references in unstructured text that are a variant of, or syntactically unconnected with, a product's title. This can include applications ranging from, for example, contextually targeted advertisements to monetizing content via affiliate marketing networks to improving the overall quality and efficiency of search engines. Therefore, as technology advances and as people are increasingly relying on computing devices in a wider variety of ways, it can be advantageous to adapt the ways in which these product references are linked and identified in text.

BRIEF DESCRIPTION OF THE DRAWINGS

Various embodiments in accordance with the present disclosure will be described with reference to the drawings, in which:

FIGS. 6A, 6B, and 6C illustrate an example article containing links to a product in accordance with at least one embodiment;

DETAILED DESCRIPTION

Systems and methods in accordance with various embodiments of the present disclosure may overcome one or more of the aforementioned and other deficiencies experienced in conventional approaches to providing access to information in various types of content. In particular, various approaches enable a user editing a document (or other such file) to tag or otherwise indicate specific references in the document, such as may relate to products or other such items. These references can be recognizable when the document is published online, or otherwise made available, thereby enabling ad units (or other personalized units associated with the content) to be inserted either at a location associated with a particular reference or within the document in a designated location. For example, the document could be a blog post regarding a vacation to Hawaii. In this example, when editing or drafting the blog post, a client-side tool could enable a user to tag particular words within the text, such as "beach" and "sunshine," to create a hyperlink (or other such navigational link) to product pages of an electronic marketplace having items associated therewith, such as sunscreen or sunglasses. In another example, a client-side tool could auto-insert, at the end of the blog post or in another appropriate location, a list of items that someone vacationing in Hawaii might need, such as bathing suits, snorkels, fins, sunscreen, and the like. Accordingly, mentions of these items in content could be auto-converted into text-links or hyperlinks to a respective items page of the electronic marketplace.

In at least one embodiment, a product reference can be manually associated with a word for a product using a tag, for example, at the time an article is drafted. Such a tag can be identified in an automated fashion to convert the same into a hyperlink to a product or a set of product search results. For example, a publisher routinely writing about cameras on a photography blog could provide tags to hyperlink keywords or phrases within an article or information pages, for example, to a corresponding camera product page from an electronic marketplace. Accordingly, if a visitor to the publisher's website clicks on a hyperlink and purchases the corresponding product, the publisher may be provided with a percentage of the revenue from the same.

Various other functions and advantages are described and suggested below as may be provided in accordance with the various embodiments.

Figure 1:
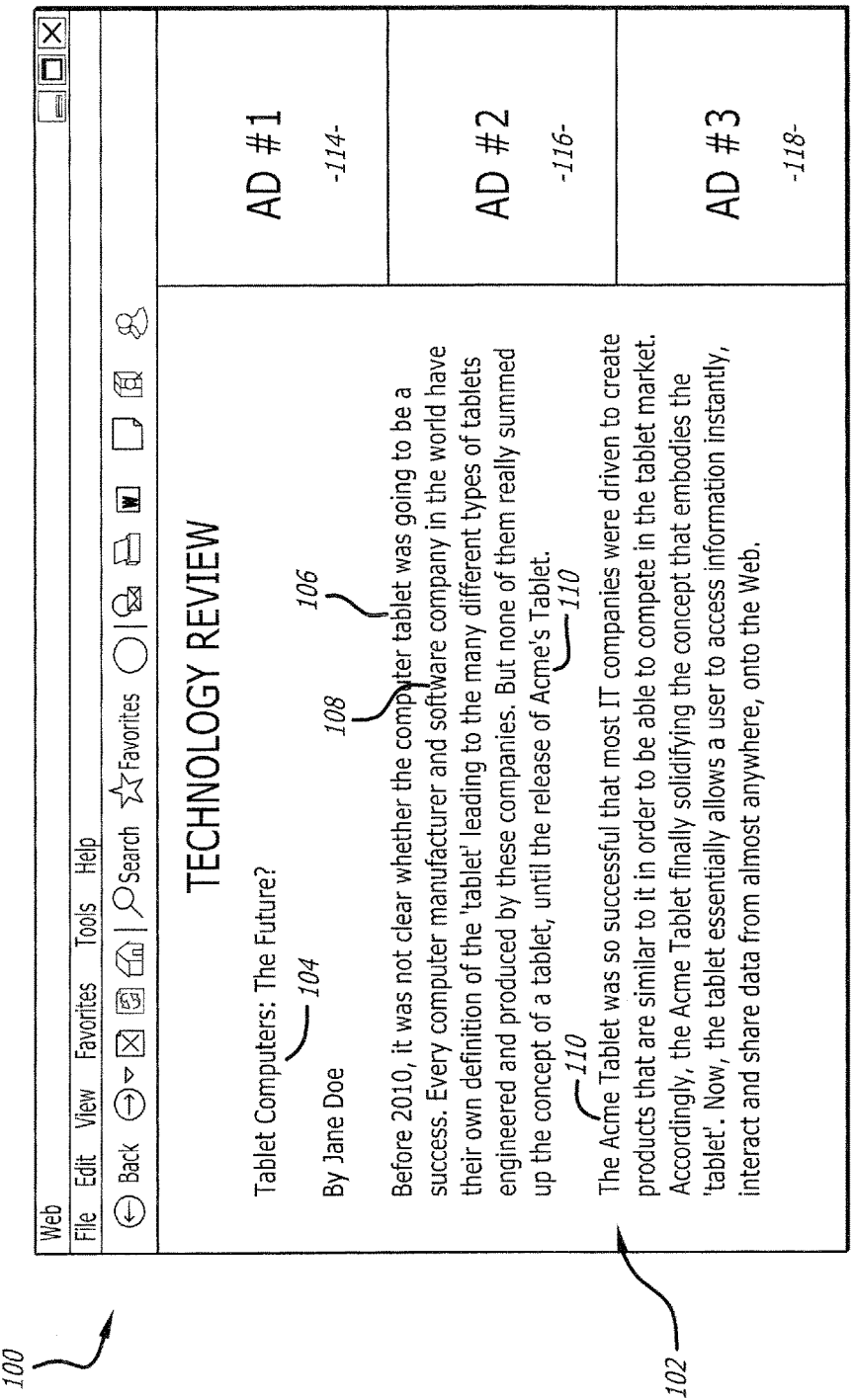
FIG. 1 illustrates an example article containing product references in accordance with at least one embodiment.

FIG. 1 illustrates an example webpage 100 shown to illustrate the opportunity associated with linking product references to product pages of an electronic marketplace. In this example, webpage 100 is displaying article 102 which is an article regarding tablet computers. In example, article 102 contains various words either specifically identifying a product or words that suggest a broader class of products. Accordingly, tablet computer 104, tablet 106, software 108, and Acme Tablet 110 each reference either a class of products or a specific product, as is the case with Acme Tablet 110. Once content, such as article 102, is created by a publisher, the content is typically displayed in the center of a webpage, as shown in FIG. 1, with the periphery of webpage 100 being reserved for various navigation, personalization, and monetization units, such as advertisements (AD#1 114, AD#2 116, AD#3 118), which may not necessarily be associated with tablet computers or products complimentary thereto. Since an article, such as article 102, is likely to be read by people who either have a potential interest in purchasing a tablet computer or by people who currently own one, these people would, therefore, likely be interested in learning more about purchasing such a tablet computer or complimentary items or accessories for the same. Accordingly, it would be advantageous to provide these people or users with a convenient way to access additional information for these items including the means to purchase the same.

In at least one embodiment, a client-side markup tool can analyze webpage 100 after it has been published in an attempt to identify words that either specifically identifying a product or words that suggest a broader class of products, such as tablet computer 104, tablet 106, software 108, and Acme Tablet 110, and link the same to a respective product page. In some instances, webpage 100 may contain more than one piece of content or article, such as a blog. For example, webpage 100 on a particular day may contain multiple articles or stories one after another. These articles may all be related to the same subject matter or they could be completely unrelated and more akin to an author's stream of conscious. It can, however, be challenging for such a tool to isolate one article or piece of content from a succeeding, or preceding article. Further, article 102 may be published on more than one URL or webpage. For example, the same article might occur on a daily summary page, monthly summary page, topic-list page, reposted by a different user on a different blog, and the like. As a result, any post publishing product reference linking will only be applied to the immediate article, thereby, requiring each published instance of the article to be located and each individual product reference to separately linked to a respective product page.

Figure 2:
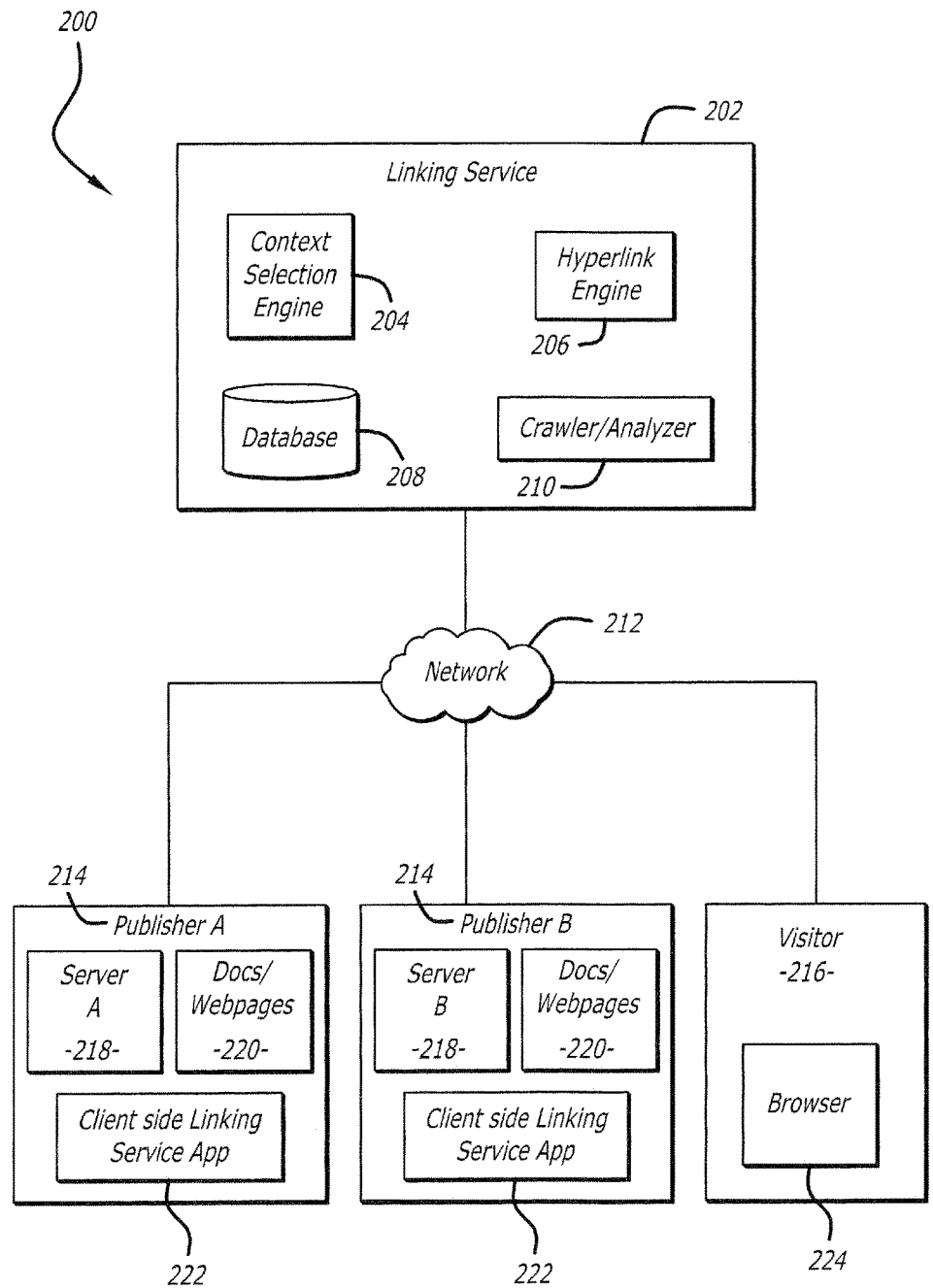
FIG. 2 illustrates an example an environment in which various embodiments can be implemented.

FIG. 2 illustrates environment 200 that can be used by service providing various product reference linking services in accordance with various embodiments. Environment 200, in this example, may include one or more end-user computers, such as one or more visitors 216, and one or more publishers 214. Visitors 216 and publishers 214 may each include one or more computers (e.g., a server, personal computer, laptop, workstation, web-enabled phone, web-enabled e-mail device, PDA, etc.) which may be connected to each other by way of network 212, such as the Internet. Visitor 216 may also include browser 224 to navigate through and access web content. Environment 200 may also include linking service 202. Environment 200 can be generally configured to allow visitors or other users to view "documents" made available by publishers 214 (e.g., a webpage including server 218 and associated documents 220 that can be generated from a repository of hypertext markup language (HTML) or other content and templates) via network 212. A "document," as used herein, may refer to any type of electronic material that contains content. For example, a document may be, but is not limited to, website(s), web page(s), spreadsheet(s), text document(s), and the like.

In this example, linking service 202 includes database 208, content selection engine 204, which can be configured to analyze and select appropriate product references for linking from web content identified by crawler/analyzer 210, which, in this example, can be a conventional web-crawler, or other web content scanning/classifying tool. Accordingly, once content selection engine 204 has identified one or more appropriate product references, linking service 202 can contact or prompt publisher 214 to suggest creating a hyperlink to the identified product references. Additionally, publisher 214, after a document or article has been published, may also contact linking service 202 to request that a hyperlink be generated. Accordingly, after publisher 214 has accepted the link suggestion or contacted linking service 202 to generate the same, hyperlink engine 206 will generate the hyperlink between the respective product reference in the publisher's document to additional content associated with the product reference in a second document or location.

In at least one embodiment, in addition to identifying product references in an automated fashion using crawler/analyzer 210 to analyze already published documents, product references can also be manually associated with a word for a product during the drafting or editing phase by publisher 214 and, subsequently, linked with an appropriate product page by linking service 202. In one example, publisher 214 can tag these product references within an article while drafting the same. In this example, the tags or some other identifier then become part of the document itself and, when published have the same tags across each instance of the published document. In this example, publisher 214 could locally download client-side linking application 222 from linking service 202 which communication with linking service 202 through network 212 to enable publisher 214 to perform various operations within a document before the document is published. Such operations can include tagging or identifying product references within an article, inserting stop and start markers in to the body of a document that may contain multiple different articles each with a respective set of tagged words (which may overlap), generally tagging the content of an article to associated the subject matter of the article with a set of products. Accordingly, client-side JavaScript can then be designed to recognize these tags and to insert appropriate advertisement units, hyperlinks, or other personalized units around the article.

Figure 3:
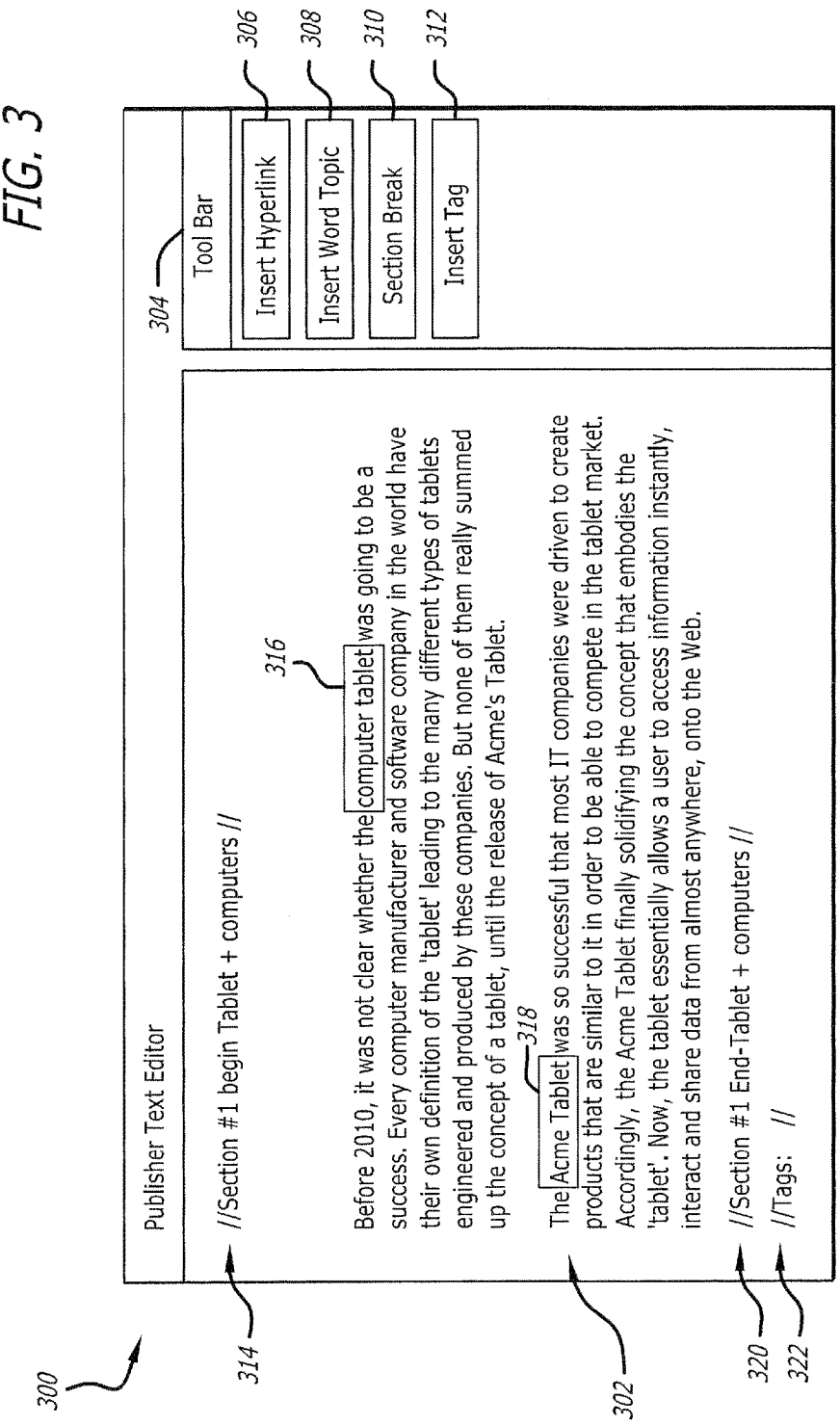
FIG. 3 illustrates an example client-side markup tool in accordance with at least one embodiment.

FIG. 3 illustrates an example publisher text editor 300 that can be used to manually associate a word or product reference with a corresponding product information or purchasing page during the drafting or editing phase in accordance with at least one embodiment. In this example, a publisher is writing or drafting article or document 302 about tablet computers. The publisher can perform various operations using publisher text editor 300 which includes tool bar 304 with insert hyperlink button 306, insert word topic button 308, section break button 310, and insert tag button 312. Accordingly, the publisher can tag or identify product references within document 302 by highlighting a respective word, such as product reference 316 and product reference 318, and selecting insert word topic 308. Similarly, publisher can designate a hyperlink to be created by highlighting a respective word, such as product reference 316 and product reference 318, and selecting insert hyperlink button 306. Further, the publisher can insert start section break 314 that marks the beginning of document 302 and insert end section break 320 marking the end of article 320 by selecting section break button 310. The publisher can also insert a number of tags in tagline 322 at the end of article 302 to generally associate a set of products with the subject matter of document 302 by selecting insert tag button 312. Further, upon identifying a word commonly associated with a product, publisher text editor 300 could suggest possible tags to the publisher.

Figure 4A:
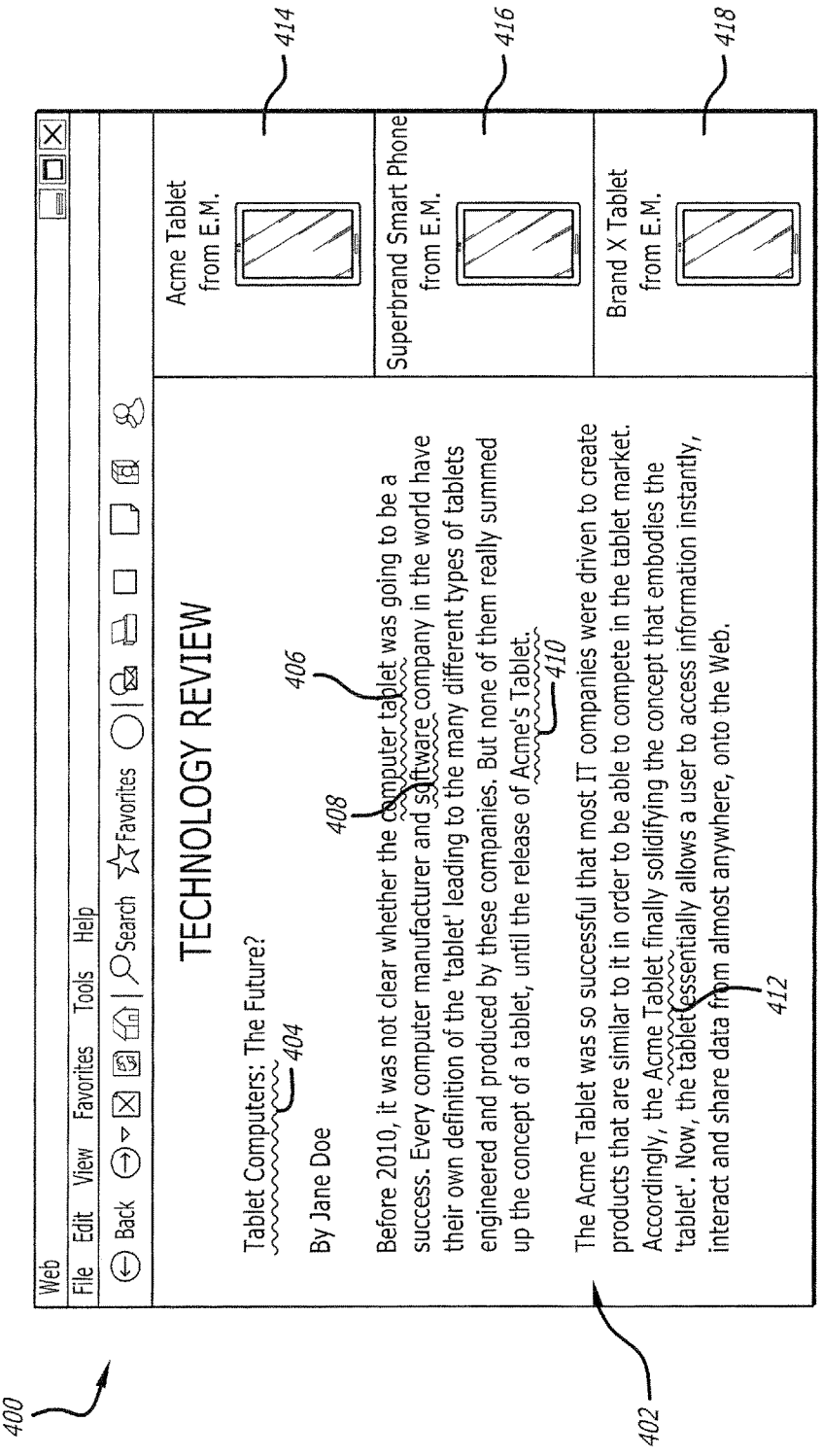
FIGS. 4A and 4B illustrate an example article containing links to a product in accordance with at least one embodiment.
Figure 4B:
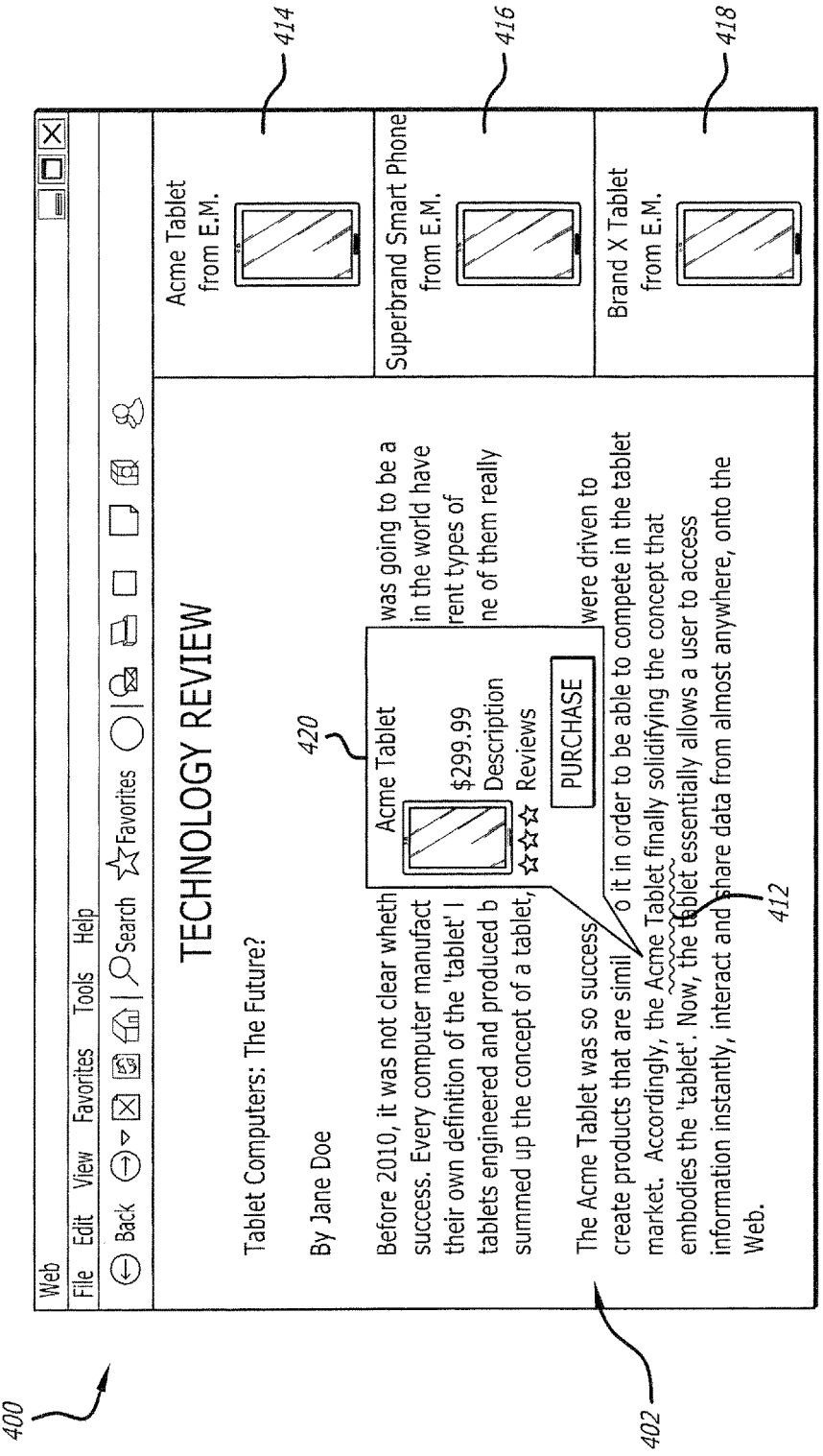

FIGS. 4A and 4B illustrate example article 402 displayed on webpage 400 that contains links to products in accordance with various embodiments. In this example, FIG. 4A shows product references (404, 406, 408, 410, 412) that each contain a link to a product page (denoted by the squiggly line). In this example, product references (404, 406) are both for a "tablet computer." Since "tablet computer" is a general term encompassing a class of products, any number of brand tablet computers could be associated with the link of product references (404, 406). Further, each time the link is selected, a different product could be presented. In another example, product reference 408 is for "software," which is even broader than tablet computers. Accordingly, when the link of product reference 408 is selected, any product from computers to actual software packages to games could be presented to a user. Finally, product references (410, 412) are to a specific brand of tablet computers, the "Acme Tablet." As a result, the advertisement for both of these links will be specific to the Acme Tablet. Accordingly, FIG. 4B shows advertisement overlay 420 for product references 412 that can be displayed when either product references 412 is selected or when a mouse or cursor is hovered above the same, for example.

Further, in this example, three are three advertisements (414, 416, 418) on the right-hand side of page 400. Since, as described in FIG. 3, a user can insert tags for the general subject matter of an article, the tags applied to this article could have been "tablet computer, smartphone, Brand X, Acme, Superbrand, headphones," and the like. As a result, client-side JavaScript, for example, could be designed to recognize these tags and determine appropriate ad units to display therewith. Accordingly, since content will be clearly identified, contextual information will be of a high quality, and corresponding ads, suggestions, and the like will likely be more relevant. Further, inserted ad units could precede or succeed the content, or be in parts of the content which are tagged for linking. In another example, an author could additionally markup parts of content with tags to show possible choices for ad-insertion.

Figure 5:
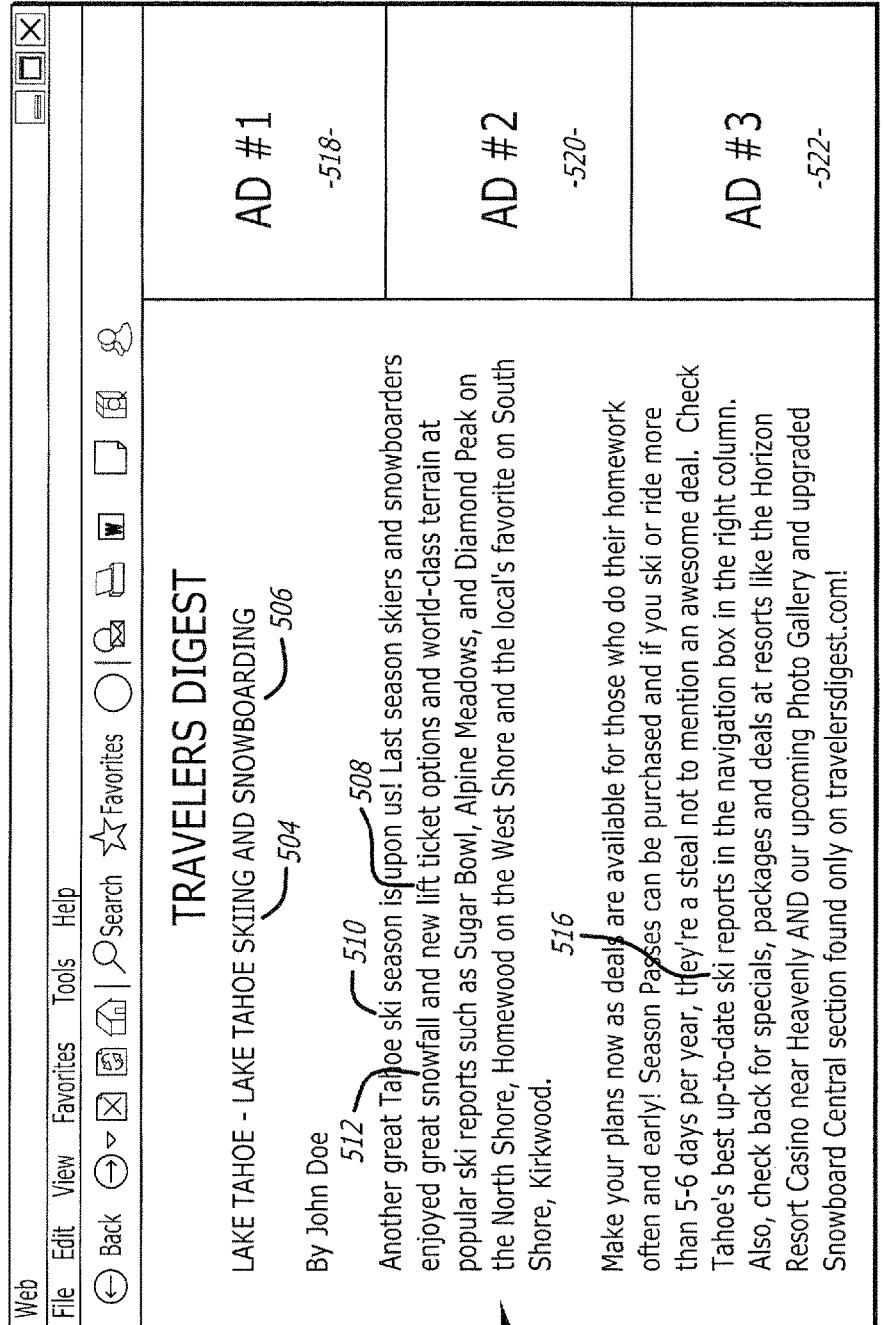
FIG. 5 illustrates an example article containing product references in accordance with at least one embodiment.

FIG. 5 illustrates an example webpage 500 also shown to illustrate the opportunity associated with linking product references to product pages of an electronic marketplace. In this example, webpage 500 is displaying article 502 which is an article regarding travelling to Lake Tahoe. In example, article 502 contains various words could suggest various products. Accordingly, skiing 504, snowboarding 506, lift 508, ski 510, snowfall 512, and ski 516 each reference a subject or topic that can make use of or suggest products. Once content, such as article 502, is created, the content is often displayed in the center of a webpage, as shown in FIG. 5, with the periphery of webpage 500 being reserved for various navigation, personalization, and monetization units, such as advertisements (AD#1 518, AD#2 520, AD#3 522), which may not necessarily be associated with travelling to Lake Tahoe or products associated with weather there. Since article 502, is likely to be read by people who are potential interest in travelling to Lake Tahoe, these people would, therefore, likely be interested in learning more about products they will need once they get there. Accordingly, it would be advantageous to provide these people or users with a convenient way to access additional information for these items including the means to purchase the same.

Figure 6A:
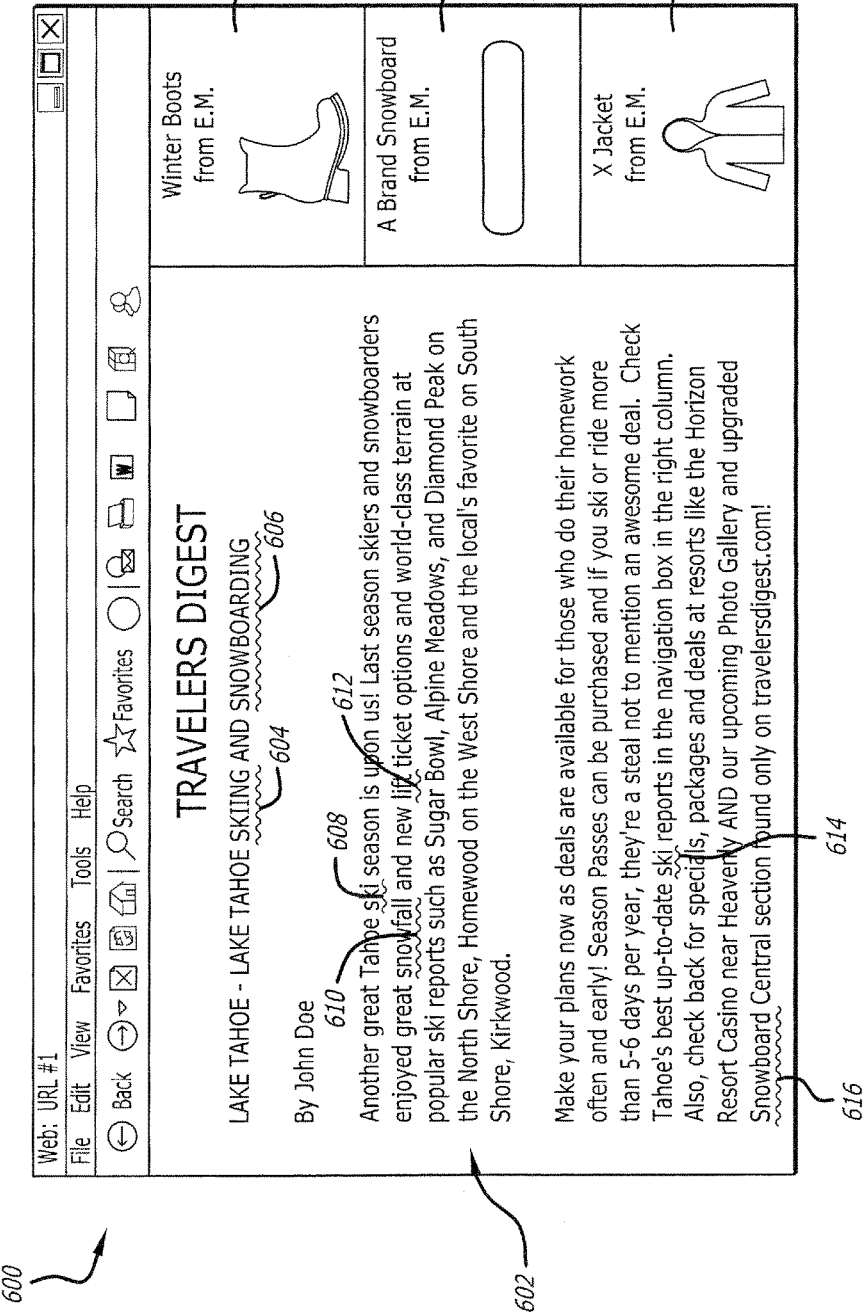
Figure 6B:
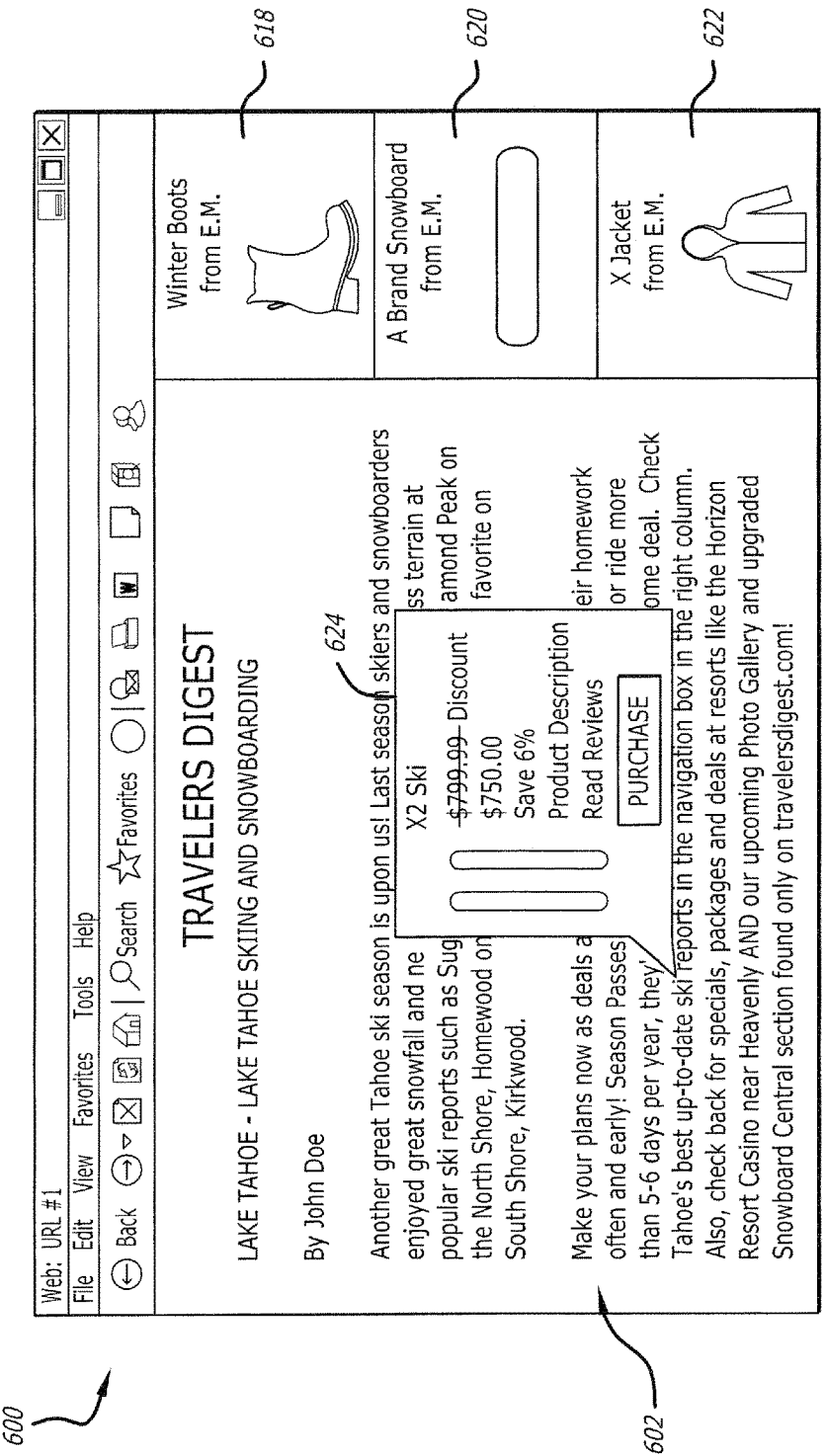

FIGS. 6A and 6B illustrate example article 602 displayed on first webpage 600 (i.e., URL #1) that contains links to products in accordance with various embodiments. In this example, FIG. 6A shows product references (604, 606, 608, 610, 612, 614, 616) that each contain a link to a product page (denoted by the squiggly line). In this example, product references (604, 608, 614) are for "skiing" and "ski." Since "skiing" and "ski" are general terms encompassing an activity, any number of brand skis, ski equipment, jackets, apparel, and the like could be associated with the link of product references (604, 608, 614). Further, each time the link is selected, a different product could be presented. Accordingly, since none of product references (606, 610, 612, 616) are a specific product, they too will encompass products relevant to the general subject associated with the respective product.

FIG. 6B shows advertisement overlay 624 for product references 614 that can be displayed when either product references 614 is selected or when a mouse or cursor is hovered above the same, for example. Further, there are three advertisements (618, 620, 622) on the right-hand side of first webpage 600. Since, as described in FIG. 3, a user can insert tags for the general subject matter of an article, the tags applied to this article could have been "jacket, X Jacket, Snowboard, Brand A, Boots, Skis," and the like. As a result, client-side JavaScript, for example, could be designed to recognize these tags and determine appropriate ad units to display therewith.

FIG. 6C illustrates article 602 displayed on second webpage 650 (i.e., URL #2) to illustrate an example of article 602 being simultaneously published, republished, or reposted separately from first webpage 600 in accordance with various embodiments. In this example, second webpage 650 could be a blog whose administrator has reposted article 602 to their own personal webpage or second webpage 650 could be a news source (or the like) that owns and/or operates both first webpage 600 and second webpage 650 and has simultaneously published article 602 on both webpages. In at least one embodiment, each tag is a component of the original document of article 602 itself. As a result, each tag can be recognized from any URL each time article 602 is published (i.e., simultaneously published, republished, or reposted). Accordingly, second webpage 650 includes the same links for product references (604, 606, 608, 610, 612, 614, 616), as shown in FIGS. 6A-6B (though not all are within displayable view in FIG. 6C). Additionally, instead of being displayed on the right-hand side of first webpage 600, as shown in FIGS. 6A-6B, advertisements (618 and 622) are displayed above and below article 602, which can be a result of the specific layout associated with second webpage 650.

Figure 7:
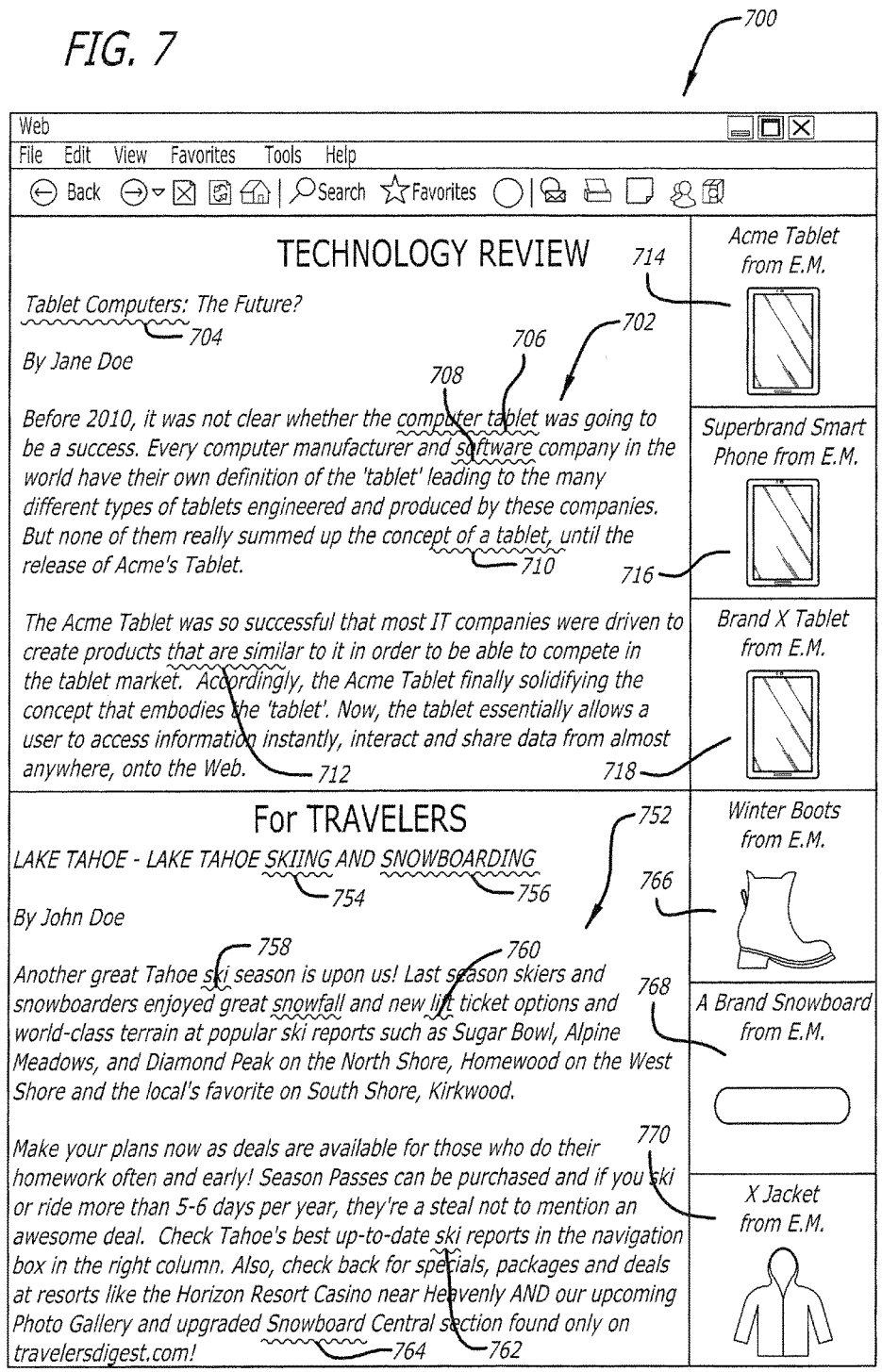
FIG. 7 illustrates an example client-side markup tool in accordance with at least one embodiment.

FIG. 7 illustrates an example publisher text editor 700 that can be used to manually associate a word or product reference with a corresponding product information or purchasing page during the drafting or editing phase in accordance with at least one embodiment. In this example, a publisher is writing or editing article 702 or article 704. The publisher can perform various operations using publisher text editor 700 which includes tool bar 720 with insert hyperlink button 722, insert word topic button 724, section break button 726, and insert tag button 728. Accordingly, the publisher can tag or identify product references within article 702 or article 704 by highlighting a respective word, such as anyone of product reference 718, and selecting insert word topic 724. Similarly, publisher can designate a hyperlink to be created by highlighting a respective word, such as product reference 718, and selecting insert hyperlink button 722. Further, the publisher can insert start section break 706 that marks the beginning of article 702 and insert end section break 710 marking the end of article 702 by selecting section break button 726. Similarly, the publisher can insert start section break 712 that marks the beginning of article 704 and insert end section break 716 marking the end of article 704 by also selecting section break button 726.

Accordingly, a plugin could run during the edit mode time, when content was being entered into a CMS, the content itself would be decorated with tags to denote start, end, and placeholders. Since this decoration would be a part of the content, it would be carried along with the content wherever the content is displayed. The publisher can also insert a number of tags in tagline 708 at the end of article 702 to generally associate a set of products with the subject matter of article 704 by selecting insert tag button 728. Similarly, tags related to article can be inserted in tagline 714 at the end of article 704 to generally associate a set of products with the subject matter of article 704 by selecting insert tag button 728. In this example, since there are two articles each with differing subject matter, the section breaks are important to keep tags for one article from incorrectly referencing a word in the other article. For example, two articles have the same word tagged. This would likely not be correct since a word in the context of tablet computers is very likely not the same as the same word used in the context of a Lake Tahoe vacation.

Figure 8:
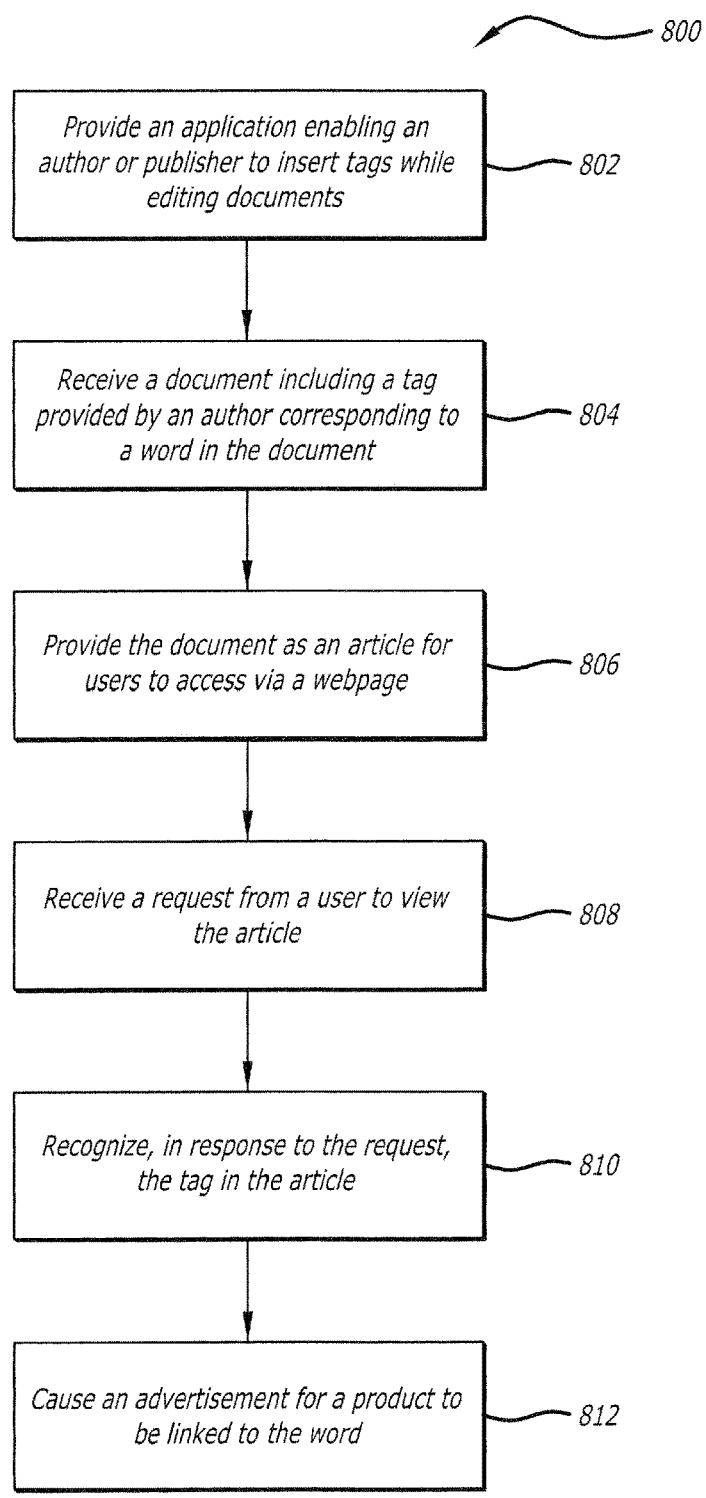
FIG. 8 illustrates an example process for linking product references to products available for purchase that can be used in accordance with at least one embodiment.

FIG. 8 illustrates an example process 800 for linking product references to product pages that can be used in accordance with various embodiments. It should be understood that, for this and other processes discussed herein, there can be additional, fewer, or alternative steps, performed in similar or alternative steps, or in parallel, within the scope of the various embodiments unless otherwise stated. In this example, an application is provided that enables an author or publisher (user) to insert tags in a document while editing documents 802. The tags, in one example, are linked with words to associate the words with a webpage corresponding to information, subject matter, advertisements, or products related to the word. Further, the application can enable a user to insert start and stop markers. These start and stop markers can be used to confine the identifiers and links associated with a particular word from being linked to the same word in a different article. For example, the word "buy" could be linked to a tablet computer in a first blog post about tablet computers and linked to purchasing lift passes a second blog post about skiing on the same webpage. Accordingly, a user attempting to be provided with more information regarding tablet computers does not necessarily want be provided with information for purchasing lift passes and vice versa. The start and stop markers, therefore, enable the same word in different articles on the same page to be tagged with different information.

Accordingly, a document that includes a tag for a corresponding to a word provided by the author or publisher is received 804. The document is subsequently provided or published as an article for users to access via a webpage 806. In this example, a request is then received from a user to view the article 808. In response to the request, the tag is recognized by, in one example, a client side application executing on a computing device of the user making the request 810. Alternatively, the tags could also be recognized on the server side. In one example, upon recognizing the tag, the client or server side application can determine the most up-to-date product, advertisement, or information for the tag. For example, if an article is initially written and first published with a tag for a first version of a product and then is subsequently republished after a second or third version of the product has been released, the client or server side application and choose to provide product information for the most recent version. In one example, the choosing of products or information for tags can be dependent on the specificity of a respective tag. There could be instances where the tag is appropriate for an earlier version of a product in which case a specific tag could be warranted. Alternatively, a tag could be general to cover a most recent version and to be able to account for any subsequent versions. Instructions for choosing between various versions could, therefore, be encoded in a tag (e.g., an HTTP comment, etc.) or stored with client or server side application (e.g., JavaScript, etc.).

Upon recognizing the tag, an advertisement for a product is linked to the word 812. Therefore, when the article is displayed to the user, the advertisement is available or accessible through the link, thereby, enabling an ad unit (or other personalized units associated with the content) to be inserted either at a location associated with a particular reference or within the document in a designated location. In various examples herein, the tag is a component of the document itself. Since the tag is a component of the document, the tag can be recognized from any URL each time the document is republished or reposted.

Further, the document can be analyzed to identify words in associated with products available for purchase from an electronic marketplace. Upon identify a word as being associated with a product, the publisher can be provided with a suggestion to tag the word with the product. In another example, the body of text can be analyzed to identify words associated with a general subject, such as surfing. Upon identify the subject as being associated with a set of products (i.e., wax, surfboards, etc.), the body of text can be automatically tagged with these items. Various other types of information and methods can be utilized and provided as well within the scope of the various embodiments.

Figure 9:
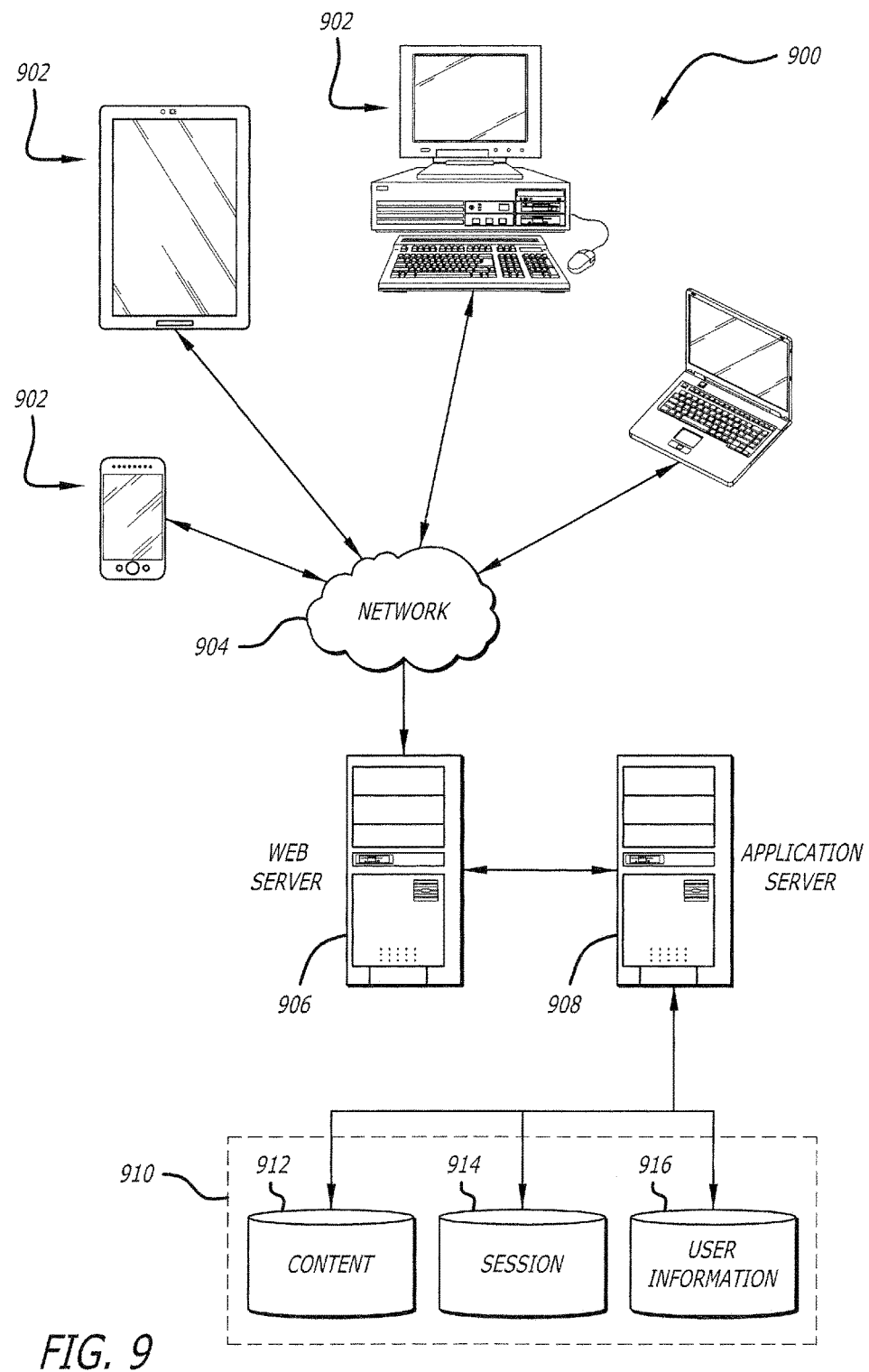
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Pert, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A non-transitory computer-readable storage medium storing instructions that, when executed by at least one processor, cause a computing device to:
    receive a document from at least one of a publisher or an author, the document including two or more tags corresponding to a word in the document and to a subject matter of the document;
    format the document for web-application access on a computer network via a first uniform resource locator (URL) by publishing content of the document in markup language to create a webpage, wherein the webpage includes two or more coded tags corresponding to the two or more tags in the document, and wherein the two or more coded tags are coded for identification using one or more client-side script for web-application access via a web-application;
    provide the webpage for rendering in the web-application;
    receive a request from the one or more client-side script which identify the two or more coded tags, the request corresponding to an advertisement from a server, wherein one or more server-side script recognizes the advertisement as of a first date, and responds with an updated advertisement as of a second date that is later than the first date based at least in part on a specificity of the coded tag corresponding to a version of the advertisement, the two or more tags corresponding to the word in the document related to a specific product reference and the two or more tags corresponding to the subject matter of the document related to a set of products within the subject matter of the document; and
    transmit the updated advertisement to display as part of the webpage or as a hyperlink, wherein the part of the webpage or the hyperlink provide visual references to the word.

2. The non-transitory computer-readable storage medium of claim 1, wherein the webpage further includes a first marker marking a beginning of the content and a second marker marking an end of the content, the part or the hyperlink each being confined to a space of the webpage defined by the first marker and the second marker.

3. The non-transitory computer-readable storage medium of claim 2, wherein the two or more tags is inserted into the document upon at least one of drafting or editing by at least one of the author or the publisher.

4. The non-transitory computer-readable storage medium of claim 1, wherein the instructions, when executed by the at least one processor, further cause the computing device to:
    analyze the webpage to identify additional words associated with corresponding products; and
    upon identifying a particular additional word associated with a particular corresponding product, providing a suggestion to tag the particular additional word with the particular corresponding product.

5. The non-transitory computer-readable storage medium of claim 1, wherein the two or more tags are a component of the document causing the two or more coded tags to be recognizable when the webpage is provided to users and the two or more coded tags are retained when the webpage is at least one of simultaneously published, republished, or reposted via at least one additional webpage.

6. The non-transitory computer-readable storage medium of claim 1, wherein the instructions, when executed by the at least one processor, further cause the computing device to:
    receive a set of words relating to products to associate with the document; and
    generate, for each of the set of words appearing in the document, a link to a respective webpage of an electronic marketplace for a respective product.

7. A computing system, comprising:
    a computing device processor;
    a memory device including instructions that, when executed by the computing device processor, cause the computing system to:
        receive a document from at least one of a publisher or an author, the document including two or more tags corresponding to a word in the document and to a subject matter of the document;
        format the document for web-application access on a computer network via a first uniform resource locator (URL) by publishing content of the document in markup language to create a webpage, wherein the webpage includes two or more coded tags corresponding to the two or more tags in the document, and wherein the two or more coded tags are coded for identification using one or more client-side script for web-application access via a web-application;
        provide the webpage for rendering in the web-application;
        receive a request from the one or more client-side script which identify the two or more coded tags, the request corresponding to an advertisement from a server, wherein one or more server-side script recognizes the advertisement as of a first date, and responds with an updated advertisement as of a second date that is later than the first date based at least in part on a specificity of the coded tag corresponding to a version of the advertisement, the two or more tags corresponding to the word in the document related to a specific product reference and the two or more tags corresponding to the subject matter of the document related to a set of products within the subject matter of the document; and transmit the updated advertisement to display as part of the webpage or as a hyperlink, wherein the part of the webpage or the hyperlink provide visual references to the word.

8. The non-transitory computer-readable storage medium of claim 7, wherein the webpage further includes a first marker marking a beginning of the content and a second marker marking an end of the content, the part or the hyperlink each being confined to a space of the webpage defined by the first marker and the second marker.

9. The non-transitory computer-readable storage medium of claim 8, wherein the two or more tags is inserted into the document upon at least one of drafting or editing by at least one of the author or the publisher.

10. The non-transitory computer-readable storage medium of claim 7, wherein the instructions, when executed by the at least one processor, further cause the computing device to:
analyze the webpage to identify additional words associated with corresponding products; and
upon identifying a particular additional word associated with a particular corresponding product, providing a suggestion to tag the particular additional word with the particular corresponding product.

11. The non-transitory computer-readable storage medium of claim 7, wherein the two or more tags are a component of the document causing the two or more coded tags to be recognizable when the webpage is provided to users and the two or more coded tags are retained when the webpage is at least one of simultaneously published, republished, or reposted via at least one additional webpage.

12. The non-transitory computer-readable storage medium of claim 7, wherein the instructions, when executed by the at least one processor, further cause the computing device to:
receive a set of words relating to products to associate with the document; and
generate, for each of the set of words appearing in the document, a link to a respective webpage of an electronic marketplace for a respective product.

13. A method, comprising:
receiving a document from at least one of a publisher or an author, the document including two or more tags corresponding to a word in the document and to a subject matter of the document;
formatting the document for web-application access on a computer network via a first uniform resource locator (URL) by publishing content of the document in markup language to create a webpage, wherein the webpage includes two or more coded tags corresponding to the two or more tags in the document, and wherein the two or more coded tags are coded for identification using one or more client-side script for web-application access via a web-application;
providing the webpage for rendering in the web-application;
receiving a request from the one or more client-side script which identify the two or more coded tags, the request corresponding to an advertisement from a server, wherein one or more server-side script recognizes the advertisement as of a first date, and responds with an updated advertisement as of a second date that is later than the first date based at least in part on a specificity of the coded tag corresponding to a version of the advertisement, the two or more tags corresponding to the word in the document related to a specific product reference and the two or more tags corresponding to the subject matter of the document related to a set of products within the subject matter of the document; and
transmitting the updated advertisement to display as part of the webpage or as a hyperlink, wherein the part of the webpage or the hyperlink provide visual references to the word.

14. The non-transitory computer-readable storage medium of claim 13, wherein the webpage further includes a first marker marking a beginning of the content and a second marker marking an end of the content, the part or the hyperlink each being confined to a space of the webpage defined by the first marker and the second marker.

15. The non-transitory computer-readable storage medium of claim 14, wherein the two or more tags is inserted into the document upon at least one of drafting or editing by at least one of the author or the publisher.

16. The non-transitory computer-readable storage medium of claim 13, wherein the instructions, when executed by the at least one processor, further cause the computing device to:
analyze the webpage to identify additional words associated with corresponding products; and
upon identifying a particular additional word associated with a particular corresponding product, providing a suggestion to tag the particular additional word with the particular corresponding product.

17. The non-transitory computer-readable storage medium of claim 13, wherein the two or more tags are a component of the document causing the two or more coded tags to be recognizable when the webpage is provided to users and the two or more coded tags are retained when the webpage is at least one of simultaneously published, republished, or reposted via at least one additional webpage.

18. The non-transitory computer-readable storage medium of claim 13, wherein the instructions, when executed by the at least one processor, further cause the computing device to:
receive a set of words relating to products to associate with the document; and
generate, for each of the set of words appearing in the document, a link to a respective webpage of an electronic marketplace for a respective product.

* * * * *